G. W. JORY.
ATTACHMENT FOR HARVESTERS AND OTHER AGRICULTURAL MACHINES.
APPLICATION FILED APR. 5, 1918.

1,309,689.
Patented July 15, 1919.
4 SHEETS—SHEET 1.

WITNESSES
Howard D. Orr.
H. T. Chapman.

INVENTOR,
George W. Jory,
BY C. G. Siggers.
ATTORNEY

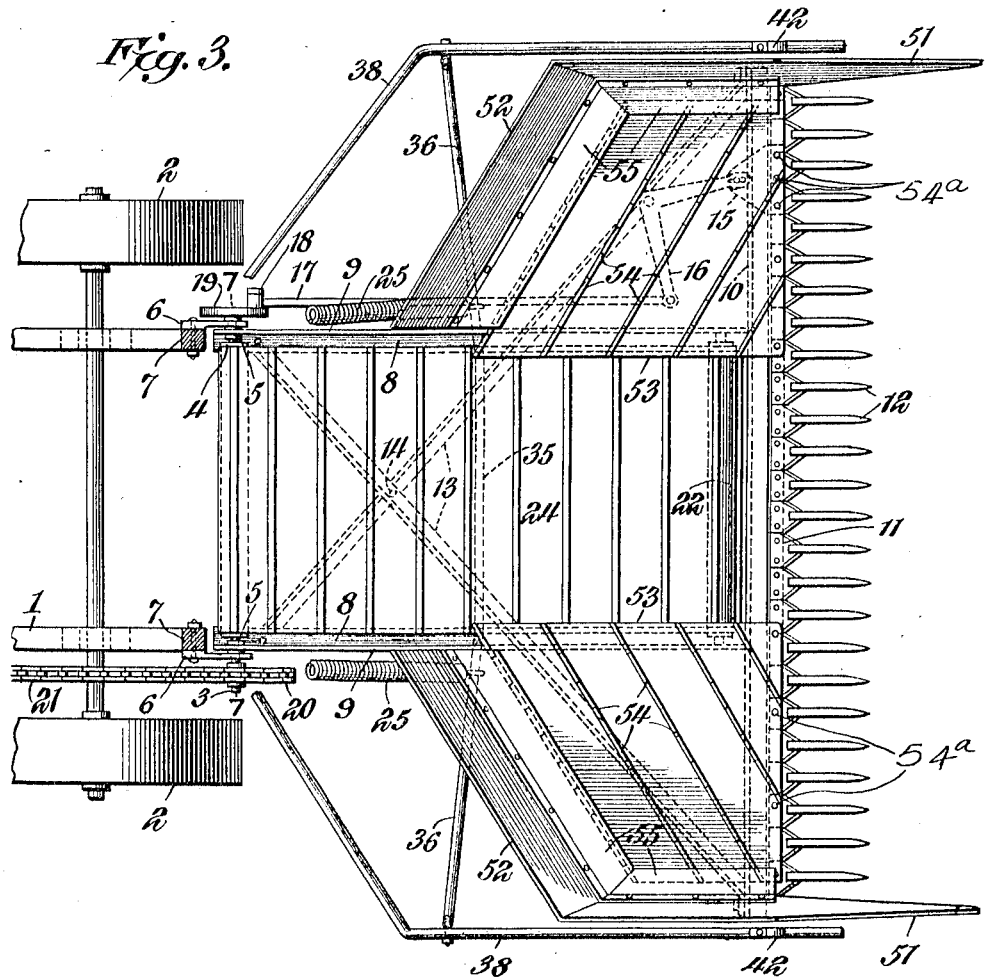

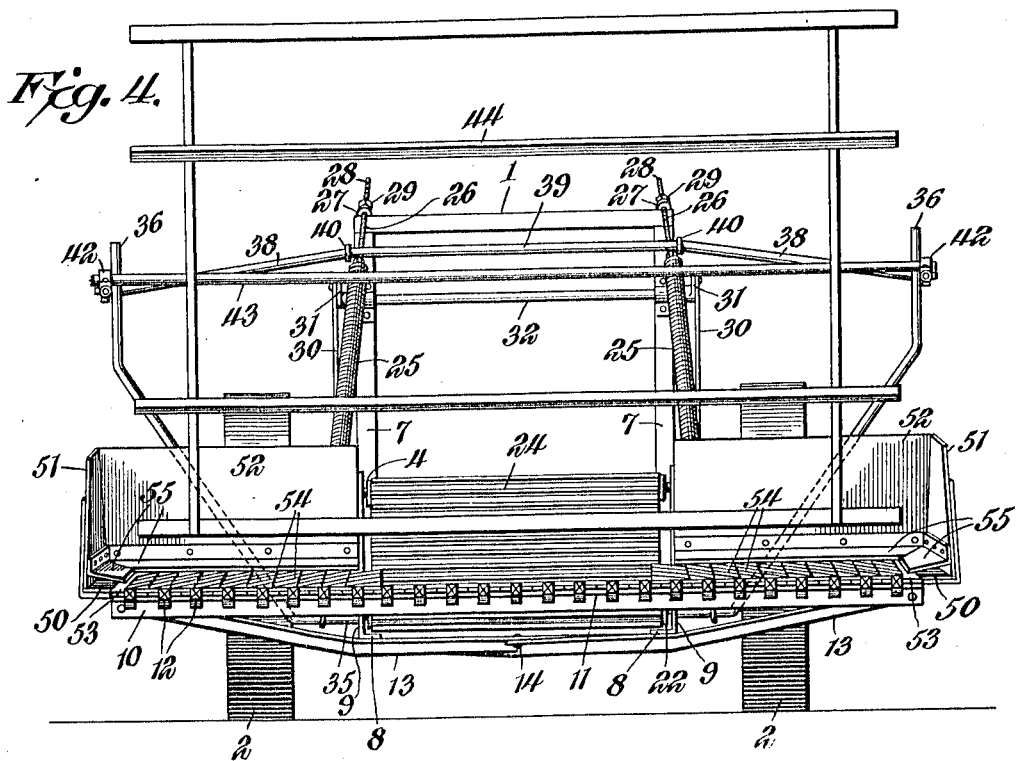
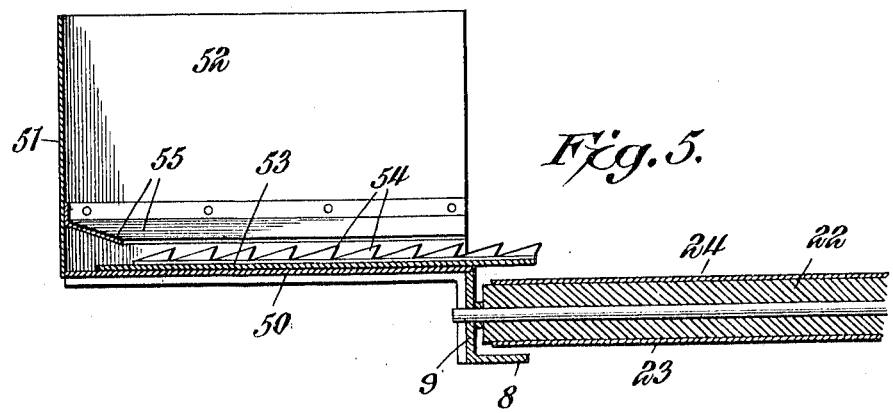

G. W. JORY.
ATTACHMENT FOR HARVESTERS AND OTHER AGRICULTURAL MACHINES.
APPLICATION FILED APR. 5, 1918.

1,309,689.

Patented July 15, 1919.
4 SHEETS—SHEET 4.

WITNESSES
Howard D. Orr.
F. T. Chapman.

George W. Jory, INVENTOR

BY E. G. Siggers.

ATTORNEY

UNITED STATES PATENT OFFICE.

GEORGE W. JORY, OF MARYSVILLE, CALIFORNIA.

ATTACHMENT FOR HARVESTERS AND OTHER AGRICULTURAL MACHINES.

1,309,689.   Specification of Letters Patent.   Patented July 15, 1919.

Application filed April 5, 1918.   Serial No. 226,875.

*To all whom it may concern:*

Be it known that I, GEORGE W. JORY, a citizen of the United States, residing at Marysville, in the county of Yuba and State of California, have invented a new and useful Attachment for Harvesters and other Agricultural Machines, of which the following is a specification.

This invention has reference to attachments for harvesters and other agricultural machines, and its object is to provide means whereby a wide cut may be made and the material cut may be delivered onto a centralized conveyer of materially less width than the width of cut.

In accordance with the invention a cutter bar is provided, capable of producing a cut wider than the tread and may extend to the full width of the machine so that the machine may follow directly back of the cutter bar without harm to any standing grain. This necessitates the use of a conveyer considerably narrower than the tread of the machine and much narrower than the cut, wherefore the invention contemplates means whereby the grain at the extreme ends of the cut is directed toward an intermediate point for delivery upon the considerably narrower conveyer.

The invention contemplates the provision of means whereby the delivery of the grain to the centralized conveyer is effected by devices to which reciprocating motion is imparted by the reciprocation of the cutter bar, although this same action may be brought about by other means. The movement of the agitating and propelling device for the cut grain is diagonally rearward, thus preventing choking or undue accumulation of grain upon the conveyer.

While the invention is particularly useful in connection with harvesters, it is also useful in connection with binders, headers and other agricultural machines and is therefore not confined in its use to harvesters alone.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 3 is a plan view of the structure shown in Figs. 1 and 2, but omitting some of the higher parts.

Fig. 4 is a front elevation of the structure shown in the preceding figures, but omitting distant parts of the harvester and also omitting the driving means for the reel.

Fig. 5 is a detail section on the line 5—5 of Fig. 2, but omitting some parts.

Figure 6:
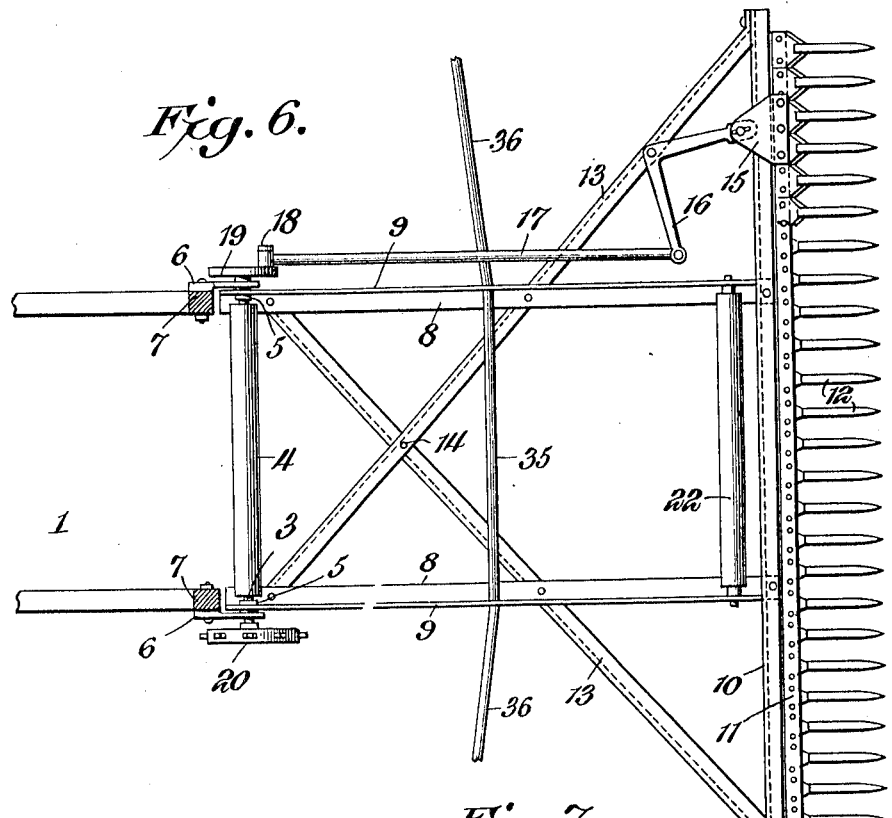
Fig. 6 is a plan view of the underlying framework of the structure shown in Fig. 3.
Figure 7:
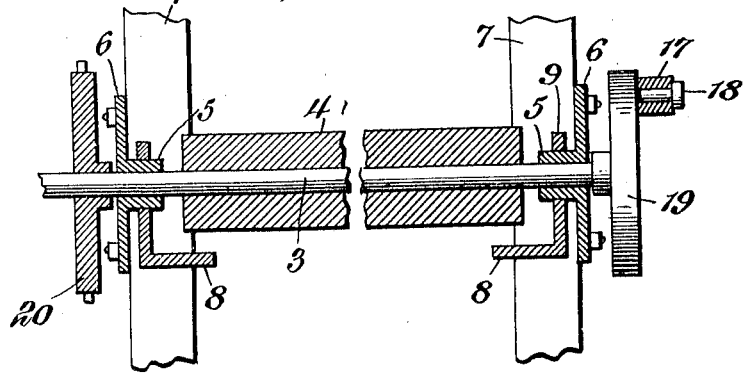
Fig. 7 is a detail section on the line 7—7 of Fig. 3 and illustrating only certain parts with the omission of other parts.

Referring to the drawings, there is shown a machine 1 mounted upon wheels 2 or other supporting devices, and this machine is to be taken as indicative of any suitable agricultural machine and is not to be taken as necessarily representative of any special form of such machine. Extending across the front of the machine 1 is a shaft 3 carrying a roller 4, the shaft and roller being best shown in Fig. 7, but appearing in Figs. 2, 3 and 6. The shaft 3 is mounted near the ends in journals 5 on brackets 6 made fast to posts 7 constituting parts of the machine 1. The journals 5 have hub portions upon which are mounted the rear ends of beams 8, each beam being preferably in the form of an angle beam with one web 9 upstanding and through which the respective journal 5 extends so that the beam may be rocked about the journal 5 as a pivot. The beams 8 extend forwardly for a suitable distance and are joined at the forward ends by another beam 10 extending crosswise of the line of travel of the machine and of a length corresponding to the width of cut. The beam 10 carries a reciprocatory cutter bar 11 of customary form and also the usual fingers 12. The cutter-bar carrying beam 10 has cross braces 13 fast thereto at the ends, these braces each extending from the end of the beam 10 to the opposite beam 8 near the rear end of the latter and are, furthermore, connected together where crossing, as indicated at 14. This produces a particularly rigid structure, holding its shape against the strains of use and at the same time capable of rocking about the journals 5.

Fast to the cutter-bar at an appropriate point, say near one end thereof, is a bracket 15 to which is pivoted a bell crank lever 16 in turn pivotally supported on one of the cross braces 13. The other end of the bell crank lever 16 is connected to one end of a link 17 in turn connected at the other end to a wrist pin 18 on a crank disk 19 fast to one end of the shaft 3, whereby rotation of the shaft imparts reciprocatory motion to the cutter bar 11. At the other end of the shaft 3 is a sprocket wheel 20 connected by a sprocket chain 21 to power devices on the vehicle 1, but such power devices are not shown, since they are common in machines of this character and need no special showing or description. Under the customary practice, such power device is usually in the form of an explosion engine.

Mounted on the forward ends of the beams 8 and located between them, closely adjacent to the beam 10, is a roller 22 which may be an idler roller, and extending between and supported by the rollers 4 and 22 is a conveyer belt 23 so arranged that its upper run 24 travels rearwardly, the conveyer belt being of a width to travel between the upstanding flanges 9 of the beams 8, which flanges are on the outer sides of the beams. The other flanges of these angle beams serve as runways or supports for the edge portions of the conveyer 23.

Connected to each beam 8 at a point about intermediate of its ends is one end of a spring 25, the other end being connected to a screw rod 26 extending through a bracket 27 at or adjacent to the upper end of a corresponding post 7, and the rod 28 is provided with a nut 29 for adjusting the tension of the spring 25. There are two springs 25, one on each side of the frame supporting the cutter bar and other parts to be described, (Fig. 4), and these two springs together counterbalance or nearly counterbalance the weight of the frame, the cutter-bar and other parts, so that the frame may be adjusted up and down with ease.

Figure 1:
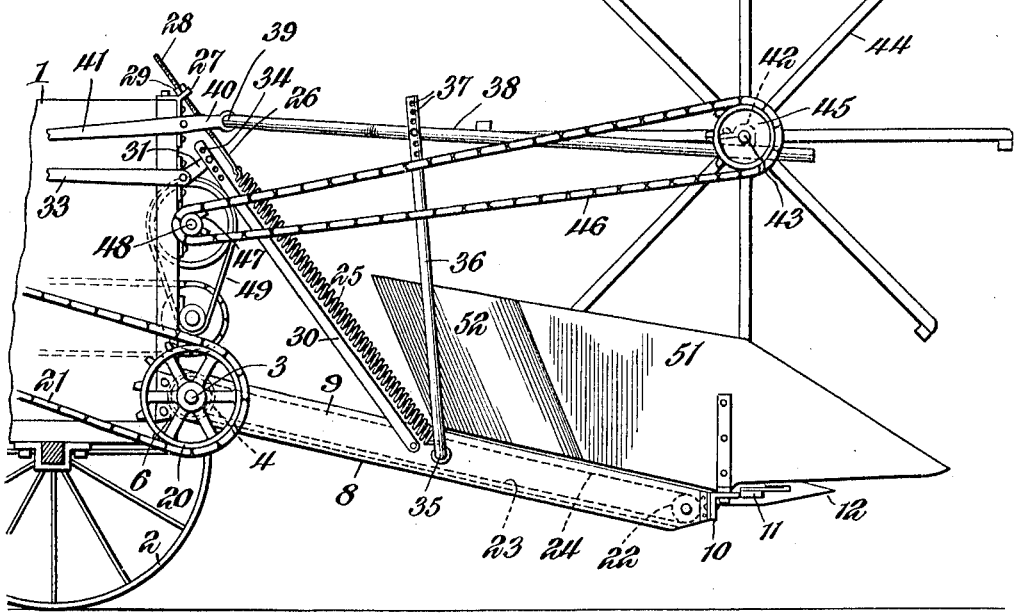
Figure 1 is a side elevation of a structure embodying the invention with the structure attached to the forward end of a harvester.
Figure 2:
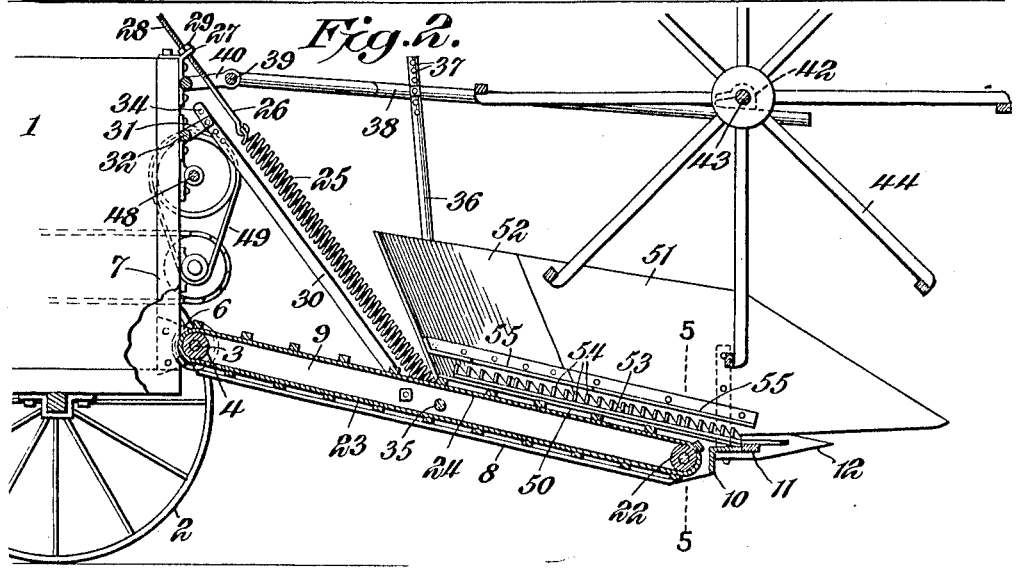
Fig. 2 is a view similar to Fig. 1, but with the attachment in longitudinal vertical section about midway of its width.

To effect such adjustment, links 30 are each connected at one end to a corresponding beam 8 near the connection thereto of the spring 25, and each link rises to a point near the top of a corresponding post 7 and is there pivotally connected to a crank arm 31 mounted on the corresponding end of a rock shaft 32 journaled to the posts 7 and extending across the front of the machine (Fig. 4). A controlling lever 33 is connected to the rock shaft 32 and extends or has connections to a convenient point of manipulation. By providing each link 30 with a series of holes 34 near its upper end the connection of the crank arm 31 with the link 30 may be varied as found desirable. Extending between the beams 8 and through and rockable in the upstanding flanges 9 thereof is an approximately U-shaped support or yoke 35 having upstanding legs 36 on the outer sides of the beams 8. (Figs. 1 and 3). Each leg 36 has a series of holes 37 at the upper end, and pivotally connected at a chosen point to each upstanding leg 36 is an arm 38 extending forwardly until about over the cutter-bar 11. The rear ends of the arms 38 are joined by a connecting member 39 and this member is in turn connected to one arm 40 of a lever 41 by means of which the arms 38 may be rocked on a substantially horizontal axis corresponding to the pivotal connections of the arms 38 with the upstanding legs 36. (Figs. 1, 2 and 3).

Mounted in journal bearings 42 near the forward ends of the arms 38 is a shaft 43 carrying a reel 44 in operative relation to the cutter-bar so as to direct grain being cut to the cutter-bar. The reel is rotated by means of a sprocket wheel 45 mounted on the shaft 43 and driven by a sprocket chain 46 in turn driven by a sprocket wheel 47 on another shaft 48 at the front of the machine 1. The shaft 48 is in turn driven by belt and sprocket gearing 49 which may be propelled by suitable connections with the power unit of the machine.

The beams 8 and braces 13 between the beams and outer ends of the beam 10 carry decks 50 flanked by upstanding guide boards or walls 51 and 52. These decks each support a series of flat strips 53 with upstanding teeth 54. The strips are connected together into a shaker member, which latter is connected at the forward end by bolts or rivets 54ª, (Fig. 3,) to the cutter-bar 11 so as to participate in the reciprocating movements thereof. The strips 53 have an angular relation to the line of travel of the machine and to the line of reciprocation of the cutter-bar so that they slant inwardly from opposite sides of the conveyer 24 toward the latter and also slant rearwardly. The result is that grain cut in the usual manner by the cutter-bar falls partly on the conveyer 24 and partly upon the strips 53 and is caused to progress by the latter and the teeth 54 thereon toward the conveyer 24, at the same time traveling rearwardly, whereby choking or clogging of the conveyer 24 is avoided, since the grain cut by the end portions of the cutter-bar is distributed lengthwise of the conveyer and reaches the latter at different points instead of all reaching the conveyer close to the cutter-bar. As shown in Fig. 5, the inner ends of the strips 53 which constitute the shaker member extend beyond the beams 8 and overhang the conveyer 23. The boards 51 and 52 carry aprons 55 in overhanging relation to the adjacent ends of the strips 53, thereby protecting such parts of the strips from the cut grain and straw. Each strip 53 may be made of sheet metal of appropriate length and width with what constitutes the rear edge upturned and formed into the teeth 54, which teeth are in rows and all point toward the conveyer 24 at an angle to the line of travel thereof. The rigid aprons extend around the boards or walls 51, 52 and are inclined downwardly toward the shaker member, and they serve to direct the grain, etc., onto the shaker member and prevent the grain from getting underneath the strips 53 or lodging on the extreme outer edges of the shaker member.

When the machine is being caused to travel through a field of grain the propelling part of the machine follows directly back of the cutter-bar, which latter cuts a swath as wide as or wider than the tread of the wheels, whereby none of the grain is injured and there is no necessity of locating the cutting mechanism to one side of the line of travel. The height of cut is readily regulated by a manipulation of the lever 33, this manipulation being facilitated by the counterbalancing action of the springs 30. The reel is readily adjusted up and down to vary the distance from the cutter-bar and also to allow for variation in height of the cutter-bar, by a proper manipulation of the lever 41.

What is claimed is:—

1. In an agricultural machine, a cutter-bar extending on opposite sides of the line of travel of the machine, centralized conveying means for grain delivered thereto from the cutter-bar, and reciprocatory grain-conveying means close to and on opposite sides of the first-named conveying means to the rear of and receiving from the cutter-bar, said reciprocatory conveying means having means for directing the received material diagonally rearward to the first-named conveying means.

2. In an agricultural machine, a cutter-bar extending on opposite sides of the line of travel of the machine to an extent greater than the tread of the machine, centralized conveyer means for grain delivered thereto from the cutter-bar, and reciprocating grain conveying means on opposite sides of the first named conveying means and extending therefrom to the ends of the cutter-bar, said reciprocating means being provided with means for directing grain falling thereon in a diagonally rearward direction toward and onto the centralized conveyer.

3. In an agricultural machine, a laterally extended cutter-bar projecting oppositely from the center line of travel for a distance greater than the tread of the machine, a centralized conveyer of less width than the tread of the machine and extending rearwardly from the cutter-bar, and conveying means on opposite sides of and directed toward the centralized conveyer and participating in the reciprocatory movements of the cutter-bar, said conveying means being of greater extent lengthwise of the centralized conveyer where delivering thereupon than at the outer end.

4. In an agricultural machine, a reciprocatory cutter-bar having means for reciprocating it, the cutter-bar extending crosswise of the center line of travel of the machine to opposite sides thereof and to a greater distance than the tread of the machine, a centralized conveyer extending rearwardly from the cutter-bar, and reciprocatory conveying means on opposite sides of the centralized conveyer and connected to the cutter-bar, whereby the side conveying means participate in the reciprocating movements of the cutter-bar.

5. In an agricultural machine, a reciprocatory cutter-bar having means for reciprocating it, the cutter-bar extending crosswise of the center line of travel of the machine to opposite sides thereof and to a greater distance than the tread of the machine, a centralized conveyer extending rearwardly from the cutter-bar, and reciprocatory conveying means on opposite sides of the centralized conveyer and connected to the cutter-bar, whereby the side conveying means participate in the reciprocating movements of the cutter-bar, said side conveying means having means for directing material falling on them in a rearward direction approaching the centralized conveying means.

6. In an agricultural machine, cutting means extending crosswise and on opposite sides of the center line of travel, conveyer means extending rearwardly from the cutting means, and other conveying means on opposite sides of the first named conveying means and provided with directing means extending diagonally rearward from the cutting means toward the first named conveying means to distribute material deposited on the second named conveying means along the first named conveying means rearwardly from the cutting means.

7. In an agricultural machine, a cutter-bar extending crosswise and to opposite sides of the center line of travel of the machine, a conveyer of less width than the length of the cutter-bar and extending rearwardly therefrom, and reciprocatory conveyer means on opposite sides of the conveyer and extending rearwardly from the cutter-bar, said reciprocatory conveyer means having directing means thereon extending diagonally with respect to the conveyer toward the latter for delivering thereonto at different points rearwardly of the cutter-bar.

8. In an agricultural machine, a cutter-bar extending across and to opposite sides of the center line of travel, conveying means extending rearwardly from the cutter-bar, and other conveying means at the sides of the first named conveying means and each comprising a series of strips arranged diagonally of the line of travel and provided at the edges with upstanding teeth directed toward the rear of the machine.

9. In an agricultural machine, a frame projecting forwardly of the machine and comprising longitudinal beams and diagonal brace beams, another beam extending crosswise of the first named beams and the brace beams and connected thereto, with the last named beam longer than the spacing of the first named beams and having the brace beams at their forward ends connected to near the extremities of the cross beam, a cutter-bar carried by the last named beam and of approximately the same length, a conveyer mounted between the first named beams and extending rearwardly from the cutter-bar, other conveyers mounted on the frame at the outer sides of the first named beams and back of the cutter-bar, and means for reciprocating the cutter-bar and simultaneously reciprocating the outer conveying means.

10. In an agricultural machine, a frame projecting forwardly of the machine and comprising longitudinal beams and diagonal brace beams, another beam extending crosswise of the first named beams and the brace beams and connected thereto, with the last named beam longer than the spacing of the first named beams and having the brace beams at their forward ends connected to the extremities of the cross beam, a cutter-bar carried by the last named beam and of approximately the same length, a conveyer mounted between the first named beams and extending rearwardly from the cutter-bar, other conveyers mounted on the frame at the outer sides of the first named beams and back of the cutter-bar, and means for reciprocating the cutter-bar and simultaneously reciprocating the outer conveying means, each of the outer conveying means comprising a series of strips diagonally disposed with relation to the length of the cutter-bar and the length of the first named conveyer and each having rearwardly directed teeth on its rear edge to direct material deposited on the strip diagonally rearward toward the first named conveyer.

11. An agricultural machine having a frame extending forwardly therefrom and pivoted at its rear end to the forward end of the machine to turn about an approximately horizontal axis, a cutter-bar carried by the forward end of the frame, conveyers carried by the frame in position to receive material discharged from the cutter-bar and direct said material to the machine, counterbalancing springs each connected at one end to an intermediate point on the frame and at the other end to a high part of the front end of the machine, and links substantially parallel with the springs and connected at their forward ends to the frame adjacent to the connections of the springs thereto and at their rear ends connected to a high point on the front end of the machine adjacent to the connections of the springs thereto, for moving the frame in an up and down direction and holding it at chosen elevations.

12. In an agricultural machine, a frame extending forwardly from the machine and pivoted at its rear end to turn about a substantially horizontal axis, a cutter-bar carried by the outer end of the frame, conveyers carried by the frame for directing material from the cutter-bar to the machine, counterbalancing springs connected to an intermediate portion of the frame, means for moving the frame up and down and holding it at chosen elevations, said frame being provided with a U-shaped support rising from the sides of the frame, side arms carried by the U-shaped support, and a reel carried by the outer ends of the arms in operative relation to the cutter-bar.

13. In an agricultural machine, cutting means extending crosswise and on opposite sides of the center line of travel, conveying means extending rearwardly from the cutting means, other conveying means on opposite sides of the first named conveying means and provided with directing means extending diagonally rearward from the cutting means toward the first named conveying means to distribute material deposited on the second named conveying means along the first named conveying means, and aprons overhanging the rear and outer side parts of the second named conveying means whereby to prevent access of cut material under said side conveying means.

14. In an agricultural machine, a reciprocatory cutter-bar, a conveyer in operative relation thereto, a driving shaft for the conveyer, a crank on the shaft, a bell crank lever connected at one end to the cutter-bar and mounted on the frame of the machine, and a link connecting the other end of the bell crank lever with the crank on the conveyer drive shaft.

15. The combination with a cutter-bar, of a centralized conveyer having a width less than the length of the cutter-bar and extending rearwardly therefrom, and conveying means arranged on opposite sides of the conveyer adjacent to the cutter-bar in receiving relation thereto and delivering onto and along the conveyer to distribute the material received by the conveying means lengthwise of the conveyer and thereby prevent clogging of the conveyer.

16. The combination with a cutter-bar, of a conveyer of a width less than the length of the cutter-bar and located intermediate of the length of and extending rearwardly from the cutter-bar, and conveying means on each side of the conveyer, extending to the ends of the cutter-bar and converging rearwardly toward the conveyer, said side conveying means being arranged at a higher plane than and overlapping the sides of the conveyer and there discharging.

17. The combination with a cutter-bar, of a conveyer of a width less than the length of the cutter-bar and located intermediate of the length of and extending rearwardly from the cutter-bar, and conveying means on each side of the conveyer and extending to the ends of the cutter-bar, said side conveying means being arranged at a higher plane than and overlapping the sides of the conveyer and there discharging, said side conveying means being of greater extent in the direction of the length of the conveyer where adjacent to the conveyer than at the ends remote therefrom.

18. The combination with a cutter-bar, of a conveyer of a width less than the length of the cutter-bar and located intermediate of the length of and extending rearwardly from the cutter-bar, and conveying means on each side of the conveyer and extending to the ends of the cutter-bar, said side conveying means being arranged at a higher plane than and overlapping the sides of the conveyer and there discharging, said side conveying means being of greater extent in the direction of the length of the conveyer where adjacent to the conveyer than at the ends remote therefrom, and the extent of the side conveying means where discharging onto the conveyer being less than the length of the conveyer.

19. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each comprising a shaker member and upstanding guide boards separate from and surrounding those portions of the shaker member which are not in communication with the conveyer and the cutter-bar.

20. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each comprising a deck with upstanding guide boards, a shaker member mounted and movable on the deck, and an apron carried by and extending inwardly from the guide boards and overhanging the adjacent edges of the shaker member.

21. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each comprising a deck and a shaker member mounted on and movable along the deck and extending inwardly beyond the deck over the conveyer.

22. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each comprising a deck with upstanding guide boards, a shaker member mounted on the deck and extending inwardly beyond the same over the conveyer, and an apron extending from the inside of the guide boards and inclining downwardly toward the shaker member.

23. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each including a shaker member which inclines inwardly and rearwardly toward the conveyer and has its inner end overhanging the latter.

24. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means extending partway along the conveyer and discharging diagonally onto the latter.

25. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means extending partway along the conveyer and having upstanding walls around the sides remote from the conveyer and cutter-bar, and inclining inwardly and rearwardly toward said conveyer.

26. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each including a shaker member with material-impelling means inclining rearwardly and inwardly toward the conveyer, and means for reciprocating the cutter-bar and the shaker members of the grain-conveying means.

27. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each including a shaker member formed of flat strips with upstanding teeth, said strips being inclined to the line of travel of the machine and to the line of reciprocation of the cutter.

28. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each including a shaker member provided with rows of upstanding teeth inclined to the line of travel of the conveyer.

29. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means each including a shaker member provided with rows of upstanding teeth, said rows inclining inwardly and rearwardly toward the conveyer, and the teeth of each row pointing toward the conveyer and inclined to the line of travel of the latter.

30. The combination with a cutter-bar, of a conveyer having a width less than the length of the cutter-bar and extending rearwardly from the latter at a point intermediate of its length, and conveying means at each side of the conveyer and extending to the respective ends of the cutter-bar, said conveying means having upstanding walls along the sides remote from the cutter-bar and conveyer, and aprons at the inner sides of the walls, said aprons declining and overhanging the adjacent edges of the conveying means.

31. The combination with a frame comprising spaced angle beams, and a long beam connecting the outer ends of the angle beams, of a cutter bar mounted on the long beam, a roller mounted in the spaced beams in rear of the cutter-bar, another roller mounted in said spaced beams at the inner ends thereof, and a conveyer belt extending between and supported by said rollers, the bottom flanges of the angle beams serving as runways for the edge portions of said belt.

32. In an agricultural machine, a frame projecting forwardly of the machine and comprising longitudinal beams and diagonal, crossed brace beams, another beam extending crosswise of the first named beams and the brace beams and connected thereto, with the last named beam longer than the spacing of the first named beams and having the brace beams at their forward ends connected to near the extremities of the cross beam, a cutter-bar carried by the last named beam and of approximately the same length, and a conveyer mounted between the first named beams and extending rearwardly from the cutter-bar.

33. The combination with a frame having journals with hub portions, spaced angle beams journaled on the hub portions, a shaft mounted in said journals, a roller mounted on said shaft between said beams, another roller journaled in the other ends of said beams, a conveyer belt connecting said rollers, and means connected to the said beams for moving the same up and down and holding the same at the desired elevation.

34. In an agricultural machine, a frame extending forwardly from the machine and pivoted at its rear end to turn about an approximately horizontal axis, a cutter-bar carried by the outer end of the frame, conveyers carried by the frame for directing material from the cutter-bar to the machine, counterbalancing springs connected to the frame at each side intermediate of the length of the frame and serving to practically counterbalance the weight of the frame and the attached parts, and means connected intermediate of the length of the frame and extending similarly to the springs for raising and lowering the frame and holding the same at the desired elevation.

35. In an agricultural machine, a frame extending forwardly from the machine, a cutter-bar carried by the outer end of the frame, said frame being provided with a U-shaped support rising from the sides of the frame, side arms carried by the U-shaped support, and a reel carried by the outer ends of the arms in operative relation to the cutter-bar.

36. In an agricultural machine, a frame extending forwardly from the machine, a cutter bar carried by the outer end of the frame, upstanding rockable legs at opposite sides of the frame, side arms pivotally connected to the upper ends of the legs, means connected to the inner ends of the arms for rocking them on a horizontal axis corresponding to the pivotal connections of the arms with the legs, a shaft journaled in the outer ends of the arms, a reel mounted on the shaft in operative relation to the cutter bar, and means for driving the reel.

In testimony that I claim the foregoing as my own I have hereto affixed my signature in the presence of two witnesses.

GEORGE W. JORY.

Witnesses:
R. M. McCORMICK,
MABEL MARDERS.

Copies of this patent may be obtained for five cents each, by addressing the "Commissioner of Patents, Washington, D. C."